US012657101B2

(12) United States Patent
Lyu

(10) Patent No.: US 12,657,101 B2
(45) Date of Patent: Jun. 16, 2026

(54) MULTIFUNCTIONAL USB INTERFACE DETECTION CIRCUIT

(71) Applicant: Yanjun Lyu, Dongguan (CN)

(72) Inventor: Yanjun Lyu, Dongguan (CN)

( * ) Notice: Subject to any disclaimer, the term of this patent is extended or adjusted under 35 U.S.C. 154(b) by 84 days.

(21) Appl. No.: 18/966,185

(22) Filed: Dec. 3, 2024

(65) Prior Publication Data

US 2026/0119353 A1 Apr. 30, 2026

(30) Foreign Application Priority Data

Oct. 31, 2024 (CN) .......................... 202422654610.5

(51) Int. Cl.
*G06F 11/30* (2006.01)
*G06F 13/38* (2006.01)

(52) U.S. Cl.
CPC ...... *G06F 11/3055* (2013.01); *G06F 11/3041* (2013.01); *G06F 13/382* (2013.01); *G06F 2213/0042* (2013.01)

(58) Field of Classification Search
CPC ............. G06F 11/3055; G06F 11/3041; G06F 13/382; G06F 2213/0042; G06F 11/3058; G06F 11/3062; G06F 11/3051; G06F 11/30; G01R 31/40
See application file for complete search history.

(56) References Cited

U.S. PATENT DOCUMENTS

| | | | | |
|---|---|---|---|---|
| 10,488,468 | B2 * | 11/2019 | Tai .......................... | G01R 31/40 |
| 12,352,827 | B1 * | 7/2025 | Ben Basat ............. | G01R 31/54 |

OTHER PUBLICATIONS

GD32F407xx ARM Cortex-M4 32-bit MCU Datasheet; Jul. 12, 2022; Giga Device; Revision 2.5; pp. 1-133 (Year: 2022).*
HC32L19x Series 32-bit ARM Cortex-M0+ Microcontroller; Jun. 21, 2023; XHSC Xiaohua Semiconductor; Version Rev1.73; pp. 1-96 (Year: 2023).*
SCXI-1104/C User Manual 32-Channel Medium-Voltage Input Module; Feb. 2000; National Instruments Corporation; Feb. 2000 Edition; pp. 1-1 thru I-4 (Year: 2000).*
Validating High Speed and Full Speed USB on the TMS320C5545 Device, Application Report; Mar. 2016; Texas Instruments Incorporated; SPRAC15; pp. 1-25 (Year: 2016).*

(Continued)

*Primary Examiner* — Idriss N Alrobaye
*Assistant Examiner* — Richard B Franklin
(74) *Attorney, Agent, or Firm* — WPAT, PC

(57) ABSTRACT

A multifunctional USB interface detection circuit includes an MCU based main controller, a power supply management circuit, a data signal detector, a power supply signal detector, a wireless transmission circuit, and a human-computer interactor. The data detector includes a CRC circuit, a data delay detector and a signal rise and fall time detector. The MCU based main controller respectively controls the data signal detector, the power supply signal detector, the wireless transmission circuit, and the human-computer interactor. The MCU based main controller controls the CRC circuit, the data delay detector and the signal rise and fall time detector respectively through the data signal detector. The multifunctional USB interface detection circuit has multiple functions, flexible and convenient detection of USB interface performance, and safe and reliable use.

10 Claims, 2 Drawing Sheets

(56) References Cited

OTHER PUBLICATIONS

TPS3808 Low-Quiescent-Current, Programmable-Delay Supervisory Circuit; Mar. 2023; Texas Instruments Incorporated; Mar. 2023 Revision; pp. 1-37 (Year: 2023).*

Understanding and Performing USB 2.0 Physical Layer Testing and Debugging; 2011; Tektronix; pp. 1-16 (Year: 2011).*

* cited by examiner

MULTIFUNCTIONAL USB INTERFACE DETECTION CIRCUIT

TECHNICAL FIELD

The disclosure relates to the field of universal serial bus (USB) interface detection technologies, and more particularly to a multifunctional USB interface detection circuit.

BACKGROUND

In portable power banks or smart chargers, USB charging port controllers can automatically detect characteristics, monitor voltage of USB data line, and automatically provide correct electrical characteristics on the data line to charge compatible devices in the configuration of special charging system. During the production of the portable power bank or the smart charger, it is necessary to inspect whether a USB charging port control chip is well-soldered and an output is normal, otherwise, the entire charging system will not work normally.

The existing USB interface detector is complicated in detecting the electrical performance of USB interface, and cannot detect multiple electrical characteristics at the same time, with a single function and inconvenient use, resulting in greatly reduced work efficiency.

SUMMARY

In view of this, the main purpose of the disclosure is to provide a multifunctional USB interface detection circuit with multiple functions, flexible and convenient detection of USB interface performance, and safe and reliable use.

In order to achieve the purpose of the disclosure, the multifunctional USB interface detection circuit includes a microcontroller unit (MCU) based main controller (also referred to MCU based main control module), a power supply management circuit (also referred to as power supply management module), a data signal detector, a power supply signal detector, a wireless transmission circuit (also referred to as wireless transmission module), and a human-computer interactor (also referred to as human-computer interaction module).

The power supply management module is configured (i.e., arranged and structured) to provide power to the MCU based main control module. The MCU based main control module is configured to control, analyze and process information. The data signal detector is configured to detect data signal information. The power supply signal detector is configured to detect power supply signal information. The wireless transmission module is configured to transmit information. The human-computer interaction module is configured to control human-computer interaction information.

The data detector includes a cyclic redundancy check (CRC) circuit (also referred to as CRC module), a data delay detector and a signal rise and fall time detector. The CRC module is configured to detect integrity of a data signal. The data delay detector is configured to detect delay time of the data signal during transmission. The signal rise and fall time detector is configured to detect synchronous extraction and anti-interference performance of the data signal.

The MCU based main control module is further configured to respectively control the data signal detector, the power supply signal detector, the wireless transmission module and the human-computer interaction module. The MCU based main control module is further configured to control the CRC module, the data delay detector and the signal rise and fall time detector respectively through the data signal detector.

In an embodiment, the MCU based main control module includes a chip of GD32F407.

In an embodiment, the power supply signal detector includes a power factor detector configured to detect energy loss of a power supply signal.

In an embodiment, the power supply signal detector includes a harmonic content detector configured to detect stability of the power supply signal.

In an embodiment, the power supply signal detector includes a ripple coefficient detector configured to detect purity of the power supply signal.

In an embodiment, that power supply signal detector includes a voltage and current detector configured to detect voltage and current stability of the power supply signal.

In an embodiment, the data delay detector includes a data cache (also referred to as data cache module), a signal comparator (also referred to as signal comparison module) and a signal delay controller, and the data cache module is configured to transmit a data detection signal to the signal delay controller through the signal comparison module.

In an embodiment, the signal rise and fall time detector includes a voltage comparator, a signal edge trigger (also referred to as signal edge trigger module) and a counter, and the voltage comparator is configured to transmit the data detection signal to the counter through the signal edge trigger module.

In an embodiment, the harmonic content detector includes a band-pass filter, a signal amplification circuit, a first alternating current to direct current (AC-DC) converter and a digital signal processing (DSP) based circuit (also referred to as DSP module). The band-pass filter is configured to transmit the power supply detection signal to the first AC-DC converter through the signal amplification circuit, and the first AC-DC converter is configured to convert the power supply detection signal into a digital signal and transmit the digital signal to the DSP module.

In an embodiment, the ripple coefficient detector includes an optical coupler isolator, a filter circuit, a signal amplification circuit and a second AC-DC converter. The optical coupler isolator is configured to transmit the power supply detection signal to the signal amplification circuit through the filter circuit, and the signal amplification circuit is configured to transmit the power supply detection signal to the second AC-DC converter.

Technical solutions provide by that disclosure have the beneficial effects as follows. (1) The disclosure includes the MCU based main control module, the power supply management module, the data signal detector, the power supply signal detector, the wireless transmission module, and the human-computer interaction module. The data detector includes the CRC module, the data delay detector and the signal rise and fall time detector. The MCU based main control module respectively controls the data signal detector, the power supply signal detector, the wireless transmission module and the human-computer interaction module. The MCU based main control module respectively controls the CRC module, the data delay detector and the signal rise and fall time detector through the data signal detector. The disclosure has the advantages of more comprehensive detection of the electrical performance of the USB interface, multiple functions, high degree of automation, and more flexible and convenient use. (2) The disclosure has the advantages of safe and reliable use and improved detection efficiency. (3) The disclosure has the advantages of reasonable structure, reduced detection cost, easy popularization and good user experience.

BRIEF DESCRIPTION OF DRAWINGS

In order to illustrate embodiments of the disclosure or technical scheme in related art more clearly, the following will briefly introduce the drawings used in the description of the embodiments or the related art. Apparently, the drawings in the following description are only some embodiments of the disclosure, and other drawings can be obtained according to the structures shown in these drawings without creative work for those skilled in the art.

The realization, functional characteristics and advantages of the disclosure will be further described with reference to the attached drawings in combination with embodiments.

DETAILED DESCRIPTION OF EMBODIMENTS

In the following, technical solutions in embodiments of the disclosure will be clearly and completely described with reference to the attached drawings. Apparently, the described embodiments are merely some of the embodiments of the disclosure, not all of the embodiments. Based on the embodiments in the disclosure, all other embodiments obtained by those skilled in the art without creative work belong to the scope of protection of the disclosure.

It should be noted that all directional indications (such as up, down, left, right, front, back, etc.) in the embodiments of the disclosure are only used to explain the relative position relationship and movement situation among components in a certain posture (as shown in the attached drawings). If the certain posture changes, the directional indications will change accordingly.

In the disclosure, unless otherwise specified and limited, the terms "connected" and "fixed" should be broadly understood. For example, "fixed" can be a fixed connection, a detachable connection, or being integrated; it can be a mechanical connection or an electrical connection; it can be directly connected or indirectly connected through an intermediary; it can be an internal connection of two elements or an interactive relationship between two elements, unless otherwise specified. For those skilled in the art, the specific meanings of the above terms in the disclosure can be understood according to specific situations.

In addition, in the disclosure, descriptions such as "first" and "second" are only used for descriptive purposes, and cannot be understood as indicating or implying their relative importance or implicitly indicating the number of indicated technical features. Therefore, the features defined as "first" and "second" can explicitly or implicitly include at least one of these features. In addition, the technical solution of each embodiment can be combined with each other, but they must be based on the realization of those skilled in the art. When the combination of technical solutions is contradictory or impossible, it should be considered that the combination of technical solutions does not exist and is not within the protection scope required by the disclosure.

The disclosure provides a multifunctional USB interface detection circuit.

Figure 1:
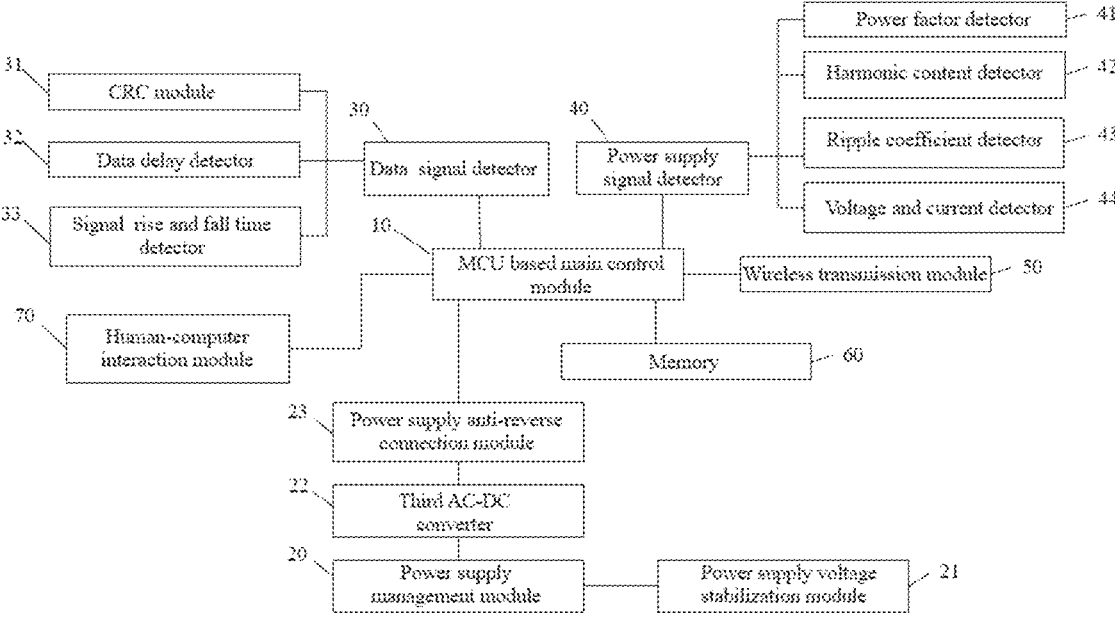
FIG. 1 illustrates a circuit block diagram of a multifunctional USB interface detection circuit according to an embodiment of the disclosure.

Referring to FIG. 1, in an embodiment of the disclosure, the multifunctional USB interface detection circuit includes an MCU based main control module 10, a power supply management module 20, a data signal detector 30, a power supply signal detector 40, a wireless transmission module 50, and a human-computer interaction module 70.

The power supply management module 20 is used to provide power to the MCU based main control module 10. The MCU based main control module 10 is used to control, analyze and process information. The data signal detector 30 is used to detect data signal information. The power supply signal detector 40 is used to detect power supply signal information. The wireless transmission module 50 is used to transmit information. The human-computer interaction module 70 is used to control human-computer interaction information.

The data detector includes a CRC module 31, a data delay detector 32, and a signal rise and fall time detector 33. The CRC module 31 is used to detect integrity of a data signal. The data delay detector 32 is used to detect delay time of the data signal during transmission. The signal rise and fall time detector 33 is used to detect synchronous extraction and anti-interference performance of the data signal.

The MCU based main control module 10 controls the data signal detector 30, the power supply signal detector 40, the wireless transmission module 50 and the human-computer interaction module 70 respectively. The MCU based main control module 10 controls the CRC module 31, the data delay detector 32 and the signal rise and fall time detector 33 respectively.

In this embodiment, the MCU based main control module 10 is a chip of GD32F407.

In this embodiment, the data signal detector 30 is a chip of National Instruments Signal Conditioning eXtensions for Instrumentation 1104C (NI SCXI-1104C).

In this embodiment, the CRC module 31 is a chip of HC32L196.

In this embodiment, the data delay detector 32 is a chip of TPS3808G33DBVR.

In this embodiment, the signal rise and fall time detector 33 is a chip of AD8568.

The CRC module 31 can be used to ensure the accuracy of data. In the process of data transmission and storage, data error or loss may occur due to various reasons, and data integrity detection can find these problems in time to ensure the accuracy and reliability of the data.

The CRC module 31 can also prevent data tampering. Malicious attackers may tamper with data to achieve illegal purposes. The data integrity detection can detect any tampering behavior of data and protect the security of data. The data integrity detection can improve system reliability and reduce system failures and accidents caused by data errors. When the system fails, data integrity detection can help quickly locate the problem. By checking the integrity of the data, it can be determined whether there is a problem at the data source, the transmission channel, or the receiving end.

In this embodiment, the data delay detector 32 can ensure the real-time performance of data detection, and the data delay detection can help determine whether the data arrives within a specified time, so as to ensure the real-time performance of the system. For example, in the fields of industrial automation, financial transactions, video conferencing, etc., low delay is the key to ensuring the normal operation of the system. The data delay detector 32 can also optimize system performance. By detecting data delay, bottlenecks and performance issues in the system can be identified. This is helpful to optimize the system design and improve the efficiency of data transmission and processing. When the system fails, the data delay detection can provide useful clues. By analyzing changes in data delay, it can be determined which link has encountered problems, such as network failures, equipment malfunctions, or software errors. This helps to quickly locate and solve problems and reduce system downtime.

In this embodiment, the signal rise and fall time detector 33 is crucial in data signal detection, and is mainly used for synchronization signal and data extraction. By detecting the rising edge or falling edge of the signal, the accurate synchronization of the signal can be realized, and the accurate transmission and processing of data can be ensured. The rise and fall time parameters of signal are crucial for enhancing the anti-interference characteristics of transmission. By optimizing the rise and fall time, the margin percentage can be increased under the same conditions, thus improving the stability and reliability of transmission.

In this embodiment, the power supply signal detector 40 includes a power factor detector 41, and the power factor detector 41 is used to detect energy loss of a power supply signal.

In this embodiment, during signal transmission, electric energy will reduce the utilization efficiency. By detecting the power factor through the power factor detector 41, measures can be taken to improve the power factor, reduce reactive power loss and improve the effective utilization of electric energy.

In this embodiment, the power supply signal detector 40 includes a harmonic content detector 42, and the harmonic content detector 42 is used to detect stability of the power supply signal.

During signal transmission, power harmonics may cause power quality problems such as voltage fluctuation and flicker, which will affect the normal operation of user equipment. Detecting the harmonic content by the harmonic content detector 42 is helpful in evaluating the power quality, taking measures to reduce the harmonic influence, and improving the stability of the power supply signal.

In this embodiment, the power supply signal detector 40 includes a ripple coefficient detector 43, and the ripple coefficient detector 43 is used to detect purity of the power supply signal.

Ripple is one of the important indicators to measure the performance of power supply. By detecting ripple by the ripple coefficient detector 43, the stability and purity of power supply output can be understood, and whether the power supply meets the requirements of the equipment can be evaluated.

In this embodiment, the power supply signal detector 40 includes a voltage and current detector 44, and the voltage and current detector 44 is used to detect voltage and current stability of the power supply signal.

The main function of the voltage and current detector 44 is to monitor the voltage and current values in the circuit, monitor the working state of the power supply signal, and improve the voltage and current stability of the power supply signal.

In this embodiment, the harmonic content detector 42 is a chip of ATT7026A.

In this embodiment, the ripple coefficient detector 43 is a chip of EA-RWSP.

Figure 2:
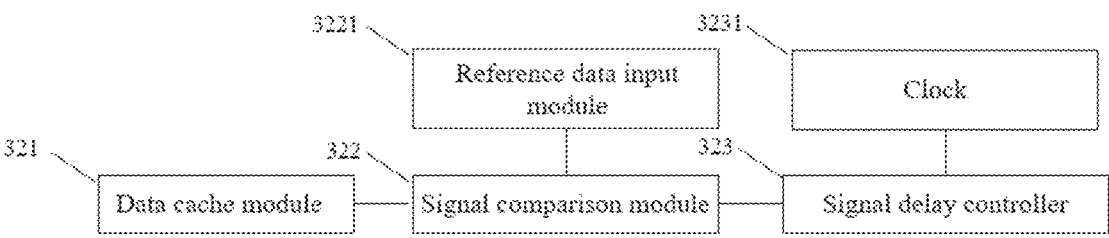
FIG. 2 illustrates a circuit block diagram of a data delay detector of the multifunctional USB interface detection circuit according to an embodiment of the disclosure.

Referring to FIG. 2, in this embodiment, the data delay detector 32 includes a data cache module 321, a signal comparison module 322 and a signal delay controller 323. The data cache module 321 transmits the data detection signal to the signal delay controller 323 through the signal comparison module 322.

The data detection information can be stored in the data cache module 321, and the signal comparison module 322 can test the data signal and accurately judge whether the signal value is within a set range in real time. The signal delay controller 323 is mainly used for signal amplification, front-end circuit protection, and signal delay adjustment.

In this embodiment, the signal comparison module 322 may include a reference data input module 3221, the reference data input module 3221 is mainly used to receive and process data of a reference station, and also to convert an input analog signal into a digital signal. The reference data input module 3221 is used to transmit a reference signal to the signal comparison module 322.

In this embodiment, the signal delay controller 323 includes a clock 3231, and the clock 3231 is used to ensure stable operation and precise time control of the signal delay controller 323.

Figure 3:
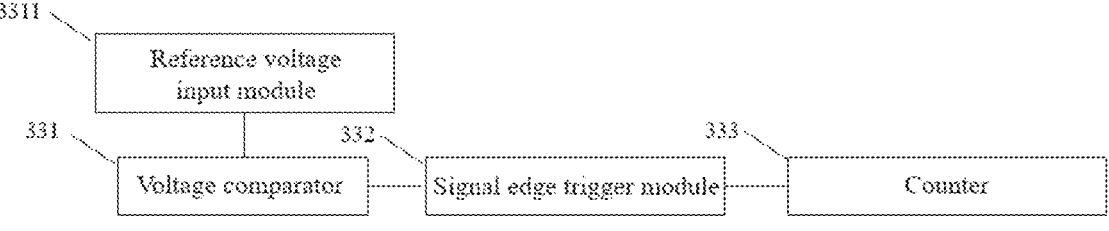
FIG. 3 illustrates a circuit block diagram of a signal rise and fall time detector of the multifunctional USB interface detection circuit according to an embodiment of the disclosure.

Referring to FIG. 3, in this embodiment, the signal rise and fall time detector 33 includes a voltage comparator 331, a signal edge trigger module 332, and a counter 333. The voltage comparator 331 is used to transmit a data detection signal to the counter 333 through the signal edge trigger module 332. It should be noted that the signal edge trigger module 332 is embodied by software stored in at least one memory and executable by at least one processor.

The voltage comparator 331 is used to detect voltage information of the data signal. The signal edge trigger module 332 is used to detect stability and anti-interference ability of the data signal. The counter 333 is used to track and regularly detect the data signal.

The voltage comparator 331 may include a reference voltage input module 3311, and the reference voltage input module 3311 is used to provide a stable voltage output, calibrate and compare voltage signals, and the reference voltage input module 3311 is further used to input a reference voltage signal to the voltage comparator 331. It should be noted that the reference voltage input module 3311 is embodied by software stored in at least one memory and executable by at least one processor.

Figure 4:
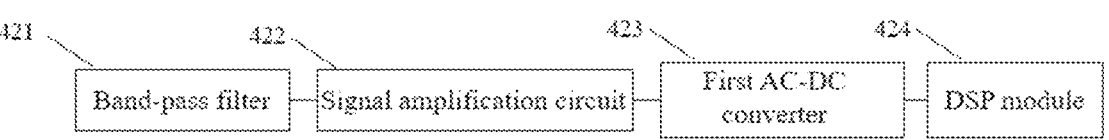
FIG. 4 illustrates a circuit block diagram of a harmonic content detector of the multifunctional USB interface detection circuit according to an embodiment of the disclosure.

Referring to FIG. 4, in this embodiment, the harmonic content detector 42 includes a band-pass filter 421, a signal amplification circuit 422, a first AC-DC converter 423, and a DSP module 424. The band-pass filter 421 is used to transmit the power supply detection signal to the first AC-DC converter 422 through the signal amplification circuit 422, and the first AC-DC converter 422 is used to convert the power supply detection signal into a digital signal (i.e., digital power supply detection signal).

The DSP module 424 is mainly used to perform noise reduction and sound insulation on the digital power supply detection signal converted by the first AC-DC converter 422, and improve the quality of the power supply detection signal.

Figure 5:
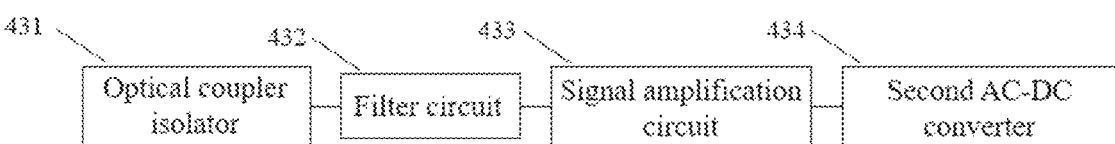
FIG. 5 illustrates a circuit block diagram of a ripple coefficient detector of the multifunctional USB interface detection circuit according to an embodiment of the disclosure.

Referring to FIG. 5, in this embodiment, the ripple coefficient detector 43 includes an optical coupler isolator 431, a filter circuit 432, a signal amplification circuit 433, and a second AC-DC converter 434. The optical coupler isolator 431 is used to transmit the power supply detection signal to the signal amplification circuit 433 through the filter circuit 432, and the signal amplification circuit 433 is used to transmit the power supply detection signal to the second AC-DC converter 434.

The optocoupler isolator 431 is used to protect the power supply detection signal, the power supply detection signal is filtered by the filter circuit 432 and then transmitted to the signal amplification circuit 433, the signal amplification circuit 433 amplifies the power supply detection signal and transmits the amplified power supply detection signal to the second AC-DC converter 434, and the second AC-DC converter 434 converts the amplified power supply detection signal into a digital signal.

Referring to FIG. 1, in this embodiment, the power supply management module 20 includes a third AC-DC converter 22 and a power supply anti-reverse connection module 23. The power supply management module 20 inputs a power supply signal to the third AC-DC converter 22, converts the power supply signal into a digital signal (i.e., digital power supply signal), and transmits the digital signal to the power supply anti-reverse connection module 23. The power supply anti-reverse connection module 23 is used to protect the power supply from reverse connection, preventing damage to the circuit of the disclosure, and further ensuring the stability of the disclosure. It should be noted that the power supply anti-reverse connection module 23 is embodied by software stored in at least one memory and executable by at least one processor.

In this embodiment, the power supply management module 20 includes a power supply voltage stabilization module 21, and the power supply voltage stabilization module 21 guarantees the stability of the power supply voltage of the power supply management module 20, so that the power supply management module 20 can supply power stably and continuously. It should be noted that the power supply voltage stabilization module 21 is embodied by software stored in at least one memory and executable by at least one processor.

In this embodiment, the power supply management module 20 transmits the power supply signal to the power supply anti-reverse connection module 23 through the third AC-DC converter 22, and the power supply anti-reverse connection module 23 inputs the power supply signal to the MCU based main control module 10.

Referring to FIG. 1, in this embodiment, the MCU based main control module 10 controls the wireless transmission module 50 and the human-computer interaction module 70 respectively. The wireless transmission module 50 may include a wireless WIFI transmitter and a BLUETOOTH transmitter. The wireless transmission module 50 can transmit the control information of the MCU based main control module 10 to a remote monitoring center, which is convenient for the remote monitoring center to monitor the control information of the MCU based main control module 10.

The human-computer interaction module 70 may include a video displayer, and the video displayer is used to display video information to facilitate human-computer interaction.

In this embodiment, the MCU based main control module 10 includes a memory 60, and the memory 60 is used to store control analysis information of the MCU based main control module 10.

The disclosure has high degree of automation, multiple functions, more convenient detection and improved working efficiency, and is a technical upgrade of the USB interface detection circuit in this field.

The above is only the illustrated embodiment of the disclosure, which does not limit the patent scope of the disclosure. Without departing from the spirit and scope of the disclosure, there will be various changes and improvements in the disclosure, and any equivalent structural transformation made by using the contents of the specification and drawings of the disclosure or direct/indirect application in other related art are included in the patent protection scope of the disclosure.

What is claimed is:

1. A multifunctional universal serial bus (USB) interface detection circuit, comprising: a microcontroller unit (MCU) based main controller, a power supply management circuit, a data signal detector, a power supply signal detector, a wireless transmission circuit, and a human-computer interactor;

wherein the power supply management circuit is configured to provide power to the MCU based main controller; the MCU based main controller is configured to control, analyze and process information; the data signal detector is configured to detect data signal information; the power supply signal detector is configured to detect power supply signal information; the wireless transmission circuit is configured to transmit the information; and the human-computer interactor is configured to control human-computer interaction information;

wherein the data detector comprises a cyclic redundancy check (CRC) circuit, a data delay detector, and a signal rise and fall time detector; the CRC circuit is configured to detect integrity of a data signal; the data delay detector is configured to detect delay time of the data signal during transmission, and the signal rise and fall time detector is configured to detect synchronous extraction and anti-interference performance of the data signal; and wherein the MCU based main controller is further configured to respectively control the data signal detector, the power supply signal detector, the wireless transmission circuit and the human-computer interactor; and the MCU based main controller is further configured to control the CRC circuit, the data delay detector and the signal rise and fall time detector respectively through the data signal detector.

2. The multifunctional USB interface detection circuit as claimed in claim 1, wherein the MCU based main controller comprises a chip of GD32F407.

3. The multifunctional USB interface detection circuit as claimed in claim 1, wherein the power supply signal detector comprises a power factor detector configured to detect energy loss of a power supply signal.

4. The multifunctional USB interface detection circuit as claimed in claim 3, wherein the power supply signal detector further comprises a harmonic content detector configured to detect stability of the power supply signal.

5. The multifunctional USB interface detection circuit as claimed in claim 4, wherein the power supply signal detector further comprises a ripple coefficient detector configured to detect purity of the power supply signal.

6. The multifunctional USB interface detection circuit as claimed in claim 5, wherein the power supply signal detector further comprises a voltage and current detector configured to detect voltage and current stability of the power supply signal.

7. The multifunctional USB interface detection circuit as claimed in claim 6, wherein the data delay detector comprises a data cache, a signal comparator and a signal delay controller, and the data cache is configured to transmit a data detection signal to the signal delay controller through the signal comparator.

8. The multifunctional USB interface detection circuit as claimed in claim 7, wherein the signal rise and fall time detector comprises a voltage comparator, a signal edge trigger and a counter, and the voltage comparator is configured to transmit the data detection signal to the counter through the signal edge trigger.

9. The multifunctional USB interface detection circuit as claimed in claim 8, wherein the harmonic content detector comprises a band-pass filter, a signal amplification circuit, a first alternating current to direct current (AC-DC) converter, and a digital signal processing (DSP) based circuit; the band-pass filter is configured to transmit a power supply detection signal to the first AC-DC converter through the signal amplification circuit, and the first AC-DC converter is configured to convert the power supply detection signal into a digital signal and transmit the digital signal to the DSP based circuit.

10. The multifunctional USB interface detection circuit as claimed in claim 9, wherein the ripple coefficient detector comprises an optical coupler isolator, a filter circuit, a signal amplification circuit and a second AC-DC converter; the optical coupler isolator is configured to transmit the power supply detection signal to the signal amplification circuit through the filter circuit, and the signal amplification circuit is configured to transmit the power supply detection signal to the second AC-DC converter.

* * * * *